United States Patent [19]
Drent

[11] Patent Number: 4,851,582
[45] Date of Patent: Jul. 25, 1989

[54] CATALYST COMPOSITIONS AND A PROCESS FOR POLYMERIZING CARBON MONOXIDE AND OLEFINS

[75] Inventor: Eit Drent, Amsterdam, Netherlands

[73] Assignee: Shell Oil Company, Houston, Tex.

[21] Appl. No.: 49,755

[22] Filed: May 13, 1987

[30] Foreign Application Priority Data

May 13, 1986 [NL] Netherlands ........................ 8601199

[51] Int. Cl.[4] ........................................ C07C 45/49

[52] U.S. Cl. .................................. 568/387; 568/311; 528/392; 502/167

[58] Field of Search ................. 528/392; 568/387, 311

[56] References Cited

U.S. PATENT DOCUMENTS

| | | | |
|---|---|---|---|
| 3,448,140 | 6/1969 | Gamlen | 260/471 |
| 3,689,460 | 9/1972 | Nozaki | 260/63 |
| 3,694,412 | 9/1972 | Nozaki | 260/63 |
| 3,835,123 | 9/1974 | Nozaki | 260/94.9 |
| 3,914,391 | 10/1975 | Nozaki | 423/364 |
| 3,919,272 | 11/1975 | Knifton | 260/410.9 |
| 3,984,388 | 10/1976 | Shryne | 260/63 |
| 4,076,911 | 2/1978 | Fenton | 526/11.1 |
| 4,474,978 | 10/1984 | Drent | 560/24 |
| 4,634,793 | 1/1987 | Drent | 560/243 |

FOREIGN PATENT DOCUMENTS

| | | | |
|---|---|---|---|
| 019483 | 11/1980 | European Pat. Off. | 568/387 |
| 121965 | 8/1984 | European Pat. Off. | 568/387 |
| 181014 | 5/1986 | European Pat. Off. | 568/387 |
| 213671 | 3/1987 | European Pat. Off. | 568/387 |
| 2046968 | 10/1964 | Japan | 568/387 |
| 74048406 | 3/1969 | Japan | 568/387 |
| 1081304 | 3/1965 | United Kingdom | 568/387 |
| 2058074 | 8/1979 | United Kingdom | 568/387 |

OTHER PUBLICATIONS

Kirk-Othmer Encyclopedia of Chemical Technology, Second Edition, vol. 12, p. 132, 1967.
Encyclopedia of Polymer Science and Technology, 1968, vol. 9, 397-402.
J. Am. Chem. Soc. 1982, 104, 3520-3522.
Tetrahedron Lett. 1971, 26, 4909-2412.
Organometallics 1984, 3, 866-870.
Proc. Ind. Assoc. Cult. Sci. 1985, 68B, 1-5.
CHEMTECH 1986, 1, 48-51.
Adv. Polym. Sci. 1986, 73-74, 125-144.
J. Organomet. Chem. 1985, 279, C5-C10.
Polym. Lett. 1965, 3, 703-707.
Chim. Ind. 1971, 53, 939-940.
J. Mol. Catal. 1983, 18, 117-125.

*Primary Examiner*—James H. Reamer
*Attorney, Agent, or Firm*—Dean F. Vance

[57] ABSTRACT

Carbon monoxide and at least one olefinically unsaturated organic compound may be polymerized by contacting the monomers in the presence of a catalyst which comprises a Group VIII metal compound of palladium, cobalt or nickel, a halide of tin or germanium, a nitrogen bidentate ligand and an organic oxidant. The polymers prepared are linear alternating polymers which consist of units with the formula $$-\overset{\overset{\displaystyle O}{\|}}{C}-(A)-,$$

where A is the residue of an alkenically unsaturated organic compound monomer.

16 Claims, No Drawings

CATALYST COMPOSITIONS AND A PROCESS FOR POLYMERIZING CARBON MONOXIDE AND OLEFINS

FIELD OF THE INVENTION

The invention relates to a process for the preparation of polymers of carbon monoxide and at least one olefinically unsaturated organic compound. The invention also relates to the catalyst compositions used in the process of the invention to prepare said polymers.

BACKGROUND OF THE INVENTION

Polymers of carbon monoxide and olefins, such as ethylene, have been known and available in limited quantities for many years. For example, polyketones are disclosed in Kirk-Othmer Encyclopedia of Chemical Technology, Second Edition, Vol. 12, p. 132, 1967, and in Encyclopedia of Polymer Science and Technology, 1968, Vol. 9, 397–402. It is known that polyketones are prepared by contacting CO and ethylene monomers in the presence of a catalyst. High molecular weight polymers of ethylene which contain small quantities of carbon monoxide can be prepared with the aid of Ziegler catalysts. Low molecular weight polymers of carbon monoxide with ethylene and possibly other olefinically unsaturated hydrocarbons in which all monomer units occur distributed at random within the polymer can be prepared with the aid of radical catalysts such as peroxides. A special class of the polymers of carbon monoxide with ethylene is formed by the high molecular weight linear polymers in which the monomer units occur in alternating order and which polymers consist of units with the formula —CO—($C_2H_4$)—. Such polymers are prepared with the aid of, among others, phosphorus-, arsenic-, antimony-, or cyanogen-containing compounds of palladium, cobalt or nickel as catalysts.

High molecular weight linear alternating polymers of carbon monoxide and ethylene consisting of units of the formula —CO—($C_2H_4$)—, can be prepared by using catalyst compositions comprising:

(a) a compound of a Group VIII metal selected from the group consisting of palladium, cobalt and nickel, (b) a non-hydrohalogenic acid with a pKa of less than 6, such as paratoluenesulphoncic acid or a metal salt of such an acid, such as a tin or germanium salt, and (c) a nitrogen bidentate ligand of the general formula

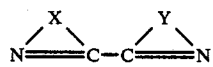

wherein X and Y represent similar or different bridging groups, each containing three or four atoms in the bridge at least two of which are carbon atoms.

Application of these catalyst compositions to a monomer mixture which, in addition to carbon monoxide, comprises for example ethylene and one or more alkenically unsaturated hydrocarbons having the general formula $C_xH_y$ leads to the formation of polymers with units of the formula —CO—($C_2H_4$)— and units of the general formula —CO—($C_xH_y$)— occurring randomly distributed through the polymer chains. The structures of the copolymers and 'terpolymers' only differ in that in the case of the 'terpolymers' a group —($C_xH_y$)— is encountered at random places in the polymer instead of a —($C_2H_4$)—group.

The activity of catalyst compositions based upon components (a)–(c) is to a great extent dependent on the nature of the component (b) used. Whereas the use of para-toluenesulphonic acid as component (b) yields catalyst compositions with a very attractive activity, this activity is lost when the para-toluenesulphonic acid is replaced by a hydrohalogenic acid, such as hydrochloric acid. The same phenomenon is observed upon replacement of the para-toluenesulphonic acid by a halide of tin or germanium, such as a chloride, as the component (b). This likewise results in a total loss of activity of the catalyst compositions.

The activity of the catalyst compositions based on components (a)–(c) for the polymerization of carbon monoxide with one or more olefinically unsaturated organic compounds can be enhanced by incorporating an organic oxidant into the compositions as component (d). The catalyst compositions based upon components (a)–(d), however, react to the use of a hydrohalogenic acid for component (b) in an analogous way to the catalyst compositions based upon components (a)–(c). In catalyst compositions based upon components (a)–(d) the use of para-toluenesulphonic acid for component (b) results in catalyst compositions having a very attractive activity whereas this activity is lost when the para-toluenesulphonic acid is replaced by a hydrohalogenic acid, such as hydrochloric acid.

In view of the disappointing results obtained with hydrohalogenic acids as component (b) in catalyst compositions based upon components (a)–(c) and in catalyst compositions based upon components (a)–(d), and in view of equally disappointing results from the use of halides of tin or germanium, as component (b) in the catalyst compositions based upon components (a)–(c), it was assumed that halides of tin or germanium were not suitable for use as component (b) in catalyst compositions based upon components (a)–(d).

SUMMARY OF THE INVENTION

In contrast with what was expected from the above observations it has now been found that catalyst compositions based upon components (a)-(d) having attractive activities for the polymerization of carbon monoxide and olefinically unsaturated compounds can be obtained using a tin or germanium halide as component (b).

The present invention therefore relates to novel catalyst compositions based upon (a) a compound of a Group VIII metal selected from the group consisting of palladium, cobalt and nickel, (b) a halide of tin or germanium, (c) a nitrogen bidentate ligand of the general formula

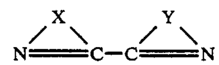

wherein X and Y represent similar or different bridging groups, each containing three or four atoms in the bridge at least two of which are carbon atoms and (d) an organic oxidant.

The invention also relates to a process using these catalyst compositions in the preparation of linear alternating polymers of carbon monoxide and at least one olefinically unsaturated organic compound which process comprises contacting carbon monoxide and at least one olefinically unsaturated organic compound in the presence of a catalyst where the catalyst is obtained by reacting (a) a compound of a Group VIII metal selected from the group consisting of palladium, cobalt and nickel, (b) a halide selected from the group consisting of halides of tin and germanium, (c) a bidentate ligand of the general formula

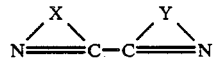

wherein X and Y represent similar or different bridging groups, each containing three or four atoms in the bridge at least two of which are carbon atoms, and (d) an organic oxidant, and under conditions suitable to prepare a linear alternating polymer.

The invention further relates to the polymers prepared in the process of the invention and to shaped objects consisting at least partly of these polymers. The polymers prepared in the process of the invention are linear polymers in which the monomer units occur in alternating order and which units have the formula

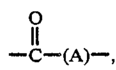

where A is the residue of an olefinically unsaturated organic compound monomer.

DESCRIPTION OF THE INVENTION

The preferred component (a) is a palladium salt of a carboxylic acid and in particular palladium acetate. A complex of a palladium halide and a triarylphosphine, in which complex the components are present in a molar ratio of 1:2 has also been found to be a very suitable component (a). Such a complex can be prepared for instance by dissolving palladium acetate in ethanol, then adding to this solution 2 mol of hydrochloric acid per mol of palladium acetate and finally adding to the solution of palladium chloride in ethanol thus obtained 2 mol of triphenylphosphine per mol of palladium chloride, upon which the complex $[(C_6H_5)_3P]_2PdCl_2$ will crystallize out.

Preferably the halide of tin or germanium used as component (b) is a chloride. Special preference is given to the use of tin chloride as the component (b). In the catalyst compositions component (b) is preferably present in a quantity of 1–100 mol and in particular 1–50 mol per gram atom of Group VIII metal.

Preferably, the nitrogen bidentate ligand used as component (c) is present in the catalyst compositions in a quantity of 0.5–200 and in particular 1–50 mol per gram-atom of Group VIII metal. In the nitrogen bidentate ligand the bridging groups X and Y are linked by the two carbon atoms shown in the general formula. In addition to this bond the bridging groups X and Y can be linked by a further bond, such as is the case with 1,10 phenanthroline and compounds derived therefrom. If, in addition to the carbon atoms, the bridging groups X and Y contain further atoms in the bridge, these atoms are preferably nitrogen atoms. Further, preference is given to nitrogen bidentate ligands wherein the bridging groups X and Y are similar. Examples of suitable nitrogen bidentate ligands are 2,2'-bipyridine and compounds derived therefrom, such as 4,4'-dimethyl-2,2'-bipyridine,
4,4'-dichloro-2,2'-bipyridine,
4,4'-dimethoxy-2,2'-bipyridine and
4,4'-dicarboxy-2,2'-bipyridine.

Further examples of suitable nitrogen bidentate ligands are 1,10-phenanthroline and compounds derived therefrom, such as 5-chloro-1,10-phenanthroline,
4,7-diphenyl-1,10-phenanthroline,
4,7-dimethyl-1,10-phenanthroline,
2,9-dichloro-1,10-phenanthroline,
1,10-phenanthroline-5-sulphonic acid and
4,7-diphenyl-1,10-phenanthroline disulfonic acids.

Examples of other suitable nitrogen bidentate ligands are 2,2'-biquinoline,
2-(2-pyridyl)benzimidazole,
3-(2-pyridyl)-5,6-diphenyl-1,2,4-triazine and the monosodium salt of
3-(2-pyridyl)-5,6-diphenyl-1,2,4-triazine-p,p'-disulphonic acid.

Preferably, the nitrogen bidentate ligand present in the catalyst composition is a 2,2'-bipyridine which may contain substitutes or a 1,10-phenanthroline which may contain substituents. Special preference is given to the compounds 2,2'-bipyridine and 1,10-phenanthroline.

In the catalyst compositions the organic oxidant used as component d) is preferably present in a quantity of 1–10000 and in particular 10–5000, mol per gram atom of Group VIII metal.

Examples of suitable organic oxidants eligible for use as the components d) in the catalyst compositions are 1,2- and 1,4-quinones, aliphatic nitrites such as methyl nitrite, ethyl nitrite, propyl nitrite and butyl nitrite, aromatic nitro-compounds such as nitrobenzene, nitrotoluene and nitrochlorobenzene and peroxides, such as di-tert-butyl peroxide and dicumyl peroxide. Preference is given to quinones and especially 1,4-quinones. In addition to substituted or unsubstituted benzoquinones other quinones, such as naphthoquinones and anthraquinones, which may contain substituents, are eligible for use. Benzoquinones are preferred, in particular 1,4-benzoquinones. Examples of suitable compounds of this type are:

2,6-dichloro-1,4-benzoquinone,
tetrachloro-1,4-benzoquinone,
2,3-dimethyl-1,4-benzoquinone,
2,6-dimethyl-1,4-benzoquinone,
monomethyl-1,4-benzoquinone,
trichloro-1,4-benzoquinone,
2,5-dihydroxy-1,4-benzoquinone,
2,5-dihydroxy-3,6-dinitro-1,4-benzoquinone and
mononitro-1,4-benzoquinone.

The preferred component (d) is 1,4-benzoquinone.

The polymerization using the catalyst compositions according to the invention is preferably carried out in a liquid diluent as a liguid phase polymerization. Liquid phase polymerization is characterized in that a quantity of diluent is used which is in excess of the polymer formed. Very suitable liquid diluents are lower alcohols such as methanol and ethanol.

Eligible olefinically unsaturated organic compounds that can be polymerized with carbon monoxide with the aid of the catalyst compositions according to the invention are compounds which consist exclusively of carbon and hydrogen and compounds which, in addition to carbon and hydrogen, contain one or more heteroatoms. By preference the catalyst compositions according to the invention are used to prepare polymers of carbon monoxide with one or more olefinically unsaturated hydrocarbons. Examples of suitable hydrocarbon monomers are ethylene and other α-olefins, such as propylene, butene-1, hexene-1 and octene-1 as well as styrene and alkyl-substituted styrenes, such as p-methyl styrene and p-ethyl styrene. The catalyst compositions according to the invention are especially suitable for use in the preparation of copolymers of carbon monoxide with ethylene and in the preparation of terpolymers of carbon monoxide with ethylene and with another olefinically unsaturated hydrocarbon, in particular propylene. The polymers prepared in the process of the invention are linear polymers in which the monomer units occur in alternating order and which units have the formula

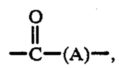

where A is the residue of an alkenically unsaturated organic compound monomer. The polymers of carbon monoxide and ethylene prepared in the process of the invention are linear alternating polymers having units of the formula

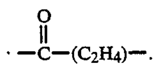

Polymers of carbon monoxide, ethylene and at least one olefinically unsaturated hydrocarbon are linear alternating polymers having units of the formula

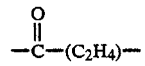

as well as units of the formula

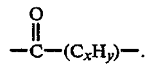

The quantity of catalyst composition applied in the preparation of the polymers may vary within wide ranges. Per mol of olefinically unsaturated compound to be polymerized, a quantity of catalyst is used which preferably contains about $1\times\times10^{-7}$ to $1\times10^{-3}$, and, in particular, about $1\times10^{-6}$ to about $1\times10^{-4}$ gram atom of Group VIII metal.

Preferably, the preparation of the polymers is carried out at a temperature of 20°-200° C. and in particular at a temperature of 30°-150° C. Preferably, the preparation of the polymers is carried out at a pressure of 1-200 bar and in particular at a pressure of 20-100 bar. In the mixture to be polymerized the molar ratio of the olefinically unsaturated organic compounds relative to carbon monoxide preferably is 10:1-1:5 and in particular 5:1-1:2. The carbon monoxide used in the preparation of the polymers according to the invention need not be pure. It may contain such contaminants as hydrogen, carbon dioxide and nitrogen.

The polymers according to the invention have good mechanical properties. They can be processed by means of the usual techniques into, among other things, films, sheets, plates, fibers and molded objects. The low molecular weight polymers in particular may be used as intermediates for the production of plastics, as components in blends with other polymers (such as waxes and greases) and as plasticizers for other polymers. The higher molecular weight polymers have use and utility as premium thermoplastics for fibers, films, injection molding, compression molding or blowing applications. On account of their properties, the higher molecular weight polymers according to the invention are suitable for many applications, such as in the auto industry, for the manufacture of packaging material for the foods and drinks, as constructional and building material, for the manufacture of cables and for a variety of applications in the domestic sphere. In order to modify their characteristics or to strengthen them, the polymers according to the invention can be employed in combination with many other sorts of materials.

The invention will now be illustrated with the aid of the following Comparative Example and Illustrative Embodiments.

COMPARATIVE EXAMPLE 1

A mechanically stirred autoclave of 250 ml capacity was charged with a catalyst solution comprising 50 ml of methanol,
0.1 mmol of palladium acetate,
4 mmol of tin chloride ($SnCl_2$), and
2 mmol of 2,2'-bipyridine.

Carbon monoxide was introduced into the autoclave until a pressure of 30 bar was reached, followed by ethylene until a pressure of 60 bar was reached. Finally the contents of the autoclave were heated to 90° C. After 1.5 hour the autoclave was cooled down to room temperature and subsequently the pressure was released. No more than a trace of polymer material was obtained.

ILLUSTRATIVE EMBODIMENT 2

A carbon monoxide/ethylene copolymer was prepared by substantially repeating Comparative Example 1, the diferences being (a) the catalyst solution in addition contained 10 mmol of 1,4-benzoquinone, (b) the reaction time was 5 hours instead of 1.5 hour, and (c) after the pressure had been released the polymer formed was filtered off, washed with methanol and dried in vacuo at room temperature.

5.3 g of copolymer was obtained.

ILLUSTRATIVE EMBODIMENT 3

A carbon monoxide/ethylene copolymer was prepared in substantially the same way as the copolymer of Illustrative Embodiment 2, the differences being (a) the catalyst solution contained 0.1 mmol bis(triphenylphosphine)palladium chloride instead of 0.1 mmol palladium acetate, and (b) the reaction temperature was 100° C. instead of 90° C.

7.0 g of copolymer was obtained.

The catalyst compositions used in Illustrative Embodiments 2 and 3 were catalyst compositions according to the invention. Comparative Example 1, where a catalyst composition containing no organic oxidant was used, falls outside the scope of the invention; it has been included in the patent application for comparison. The carbon monoxide/ethylene copolymers prepared according to Illustrative Embodiment 2 and 3 had a melting point of 257° C. With the aid of $^{13}C$-NMR analysis it was established that these polymers had a linear alternating structure and thus consisted of units of the formula —CO—($C_2H_4$)—.

What is claimed is:

1. A process for preparing a linear alternating polymer which process comprises contacting carbon monoxide and at least one olefinically unsaturated hydrocarbon in the presence of a catalyst wherein the catalyst is obtained by reacting (a) a compound of palladium selected from the group consisting of salts of carboxylic acids and complexes of halides and triarylphosphines, (b) a halide selected from the group consisting of halides of tin and germanium, (c) a bidentate ligand of the general formula

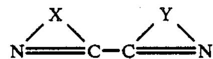

wherein X and Y represents similar or different bridging groups, each containing three or four atoms in the bridge at least two of which are carbon atoms and (d) an organic oxidant selected from the group consisting of 1,2-benzoquinones, 1.4-benzoquinones, aliphatic nitrites, aromatic nitro-compounds, and peroxides, and under conditions suitable to prepare a linear alternating polymer.

2. The process of claim 1 wherein the hydrocarbon is ethylene.

3. The process of claim 1 wherein the process is carried out by contacting the monomers with a catalyst in the presence of a liquid diluting agent.

4. The process of claim 3 wherein the liquid diluting agent is methanol.

5. The process of claim 1 wherein the catalyst is present in a quantity from about $1\times10^{-7}$ to about $1\times10^{-3}$ gram atom of palladium per mol of olefinically unsaturated hydrocarbon.

6. The process of claim 1 wherein the catalyst is present in a quantity from about $1\times10^{-6}$ to about $1\times10^{-4}$ gram atom of palladium per mol of olefinically unsaturated hydrocarbon.

7. The process of claim 2 wherein contacting temperature is from about 20° to about 200° C.

8. The process of claim 7 wherein contacting pressure is from about 1 to about 200 bar.

9. The process of claim 1 wherein the halide component (b) is present in an amount from about 1-100 mol per gram atom of palladium.

10. The process of claim 9 wherein the halide of component (b) is a chloride.

11. The process of claim 10 wherein the chloride is a tin chloride.

12. The process of claim 1 wherein the molar ratio of olefinically unsaturated hydrocarbons relative to carbon monoxide is from about 10:1 to about 1:5.

13. The process of claim 2 wherein the nitrogen bidentate ligand is selected from the group consisting of substituted and unsubstituted 2,2'-bipyridine and substituted and unsubstituted 1,10-phenanthroline.

14. A process for preparing a linear alternating polymer which process comprises contacting carbon monoxide and at least one olefinically unsaturated hydrocarbon in the presence of a catalyst wherein the catalyst is obtained by reacting (a) a palladium compound selected from the group consisting of salts of carboxylic acids and complexes of halides and triarylphosphines, (b) a tin halide, (c) a bidentate ligand of the general formula

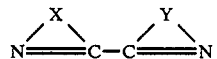

wherein X and Y represent similar or different bridging groups, each containing three or four atoms in the bridge at least two of which are carbon atoms and (d) an organic oxidant selected from the group consisting of 1,2-benzoquinones, 1,4-benzoquinones, aliphatic nitrites, aromatic nitro-compounds, and peroxides, and under conditions suitable to prepare a linear alternating polymer.

15. A process for preparing a linear alternating polymer which process comprises contacting carbon monoxide and ethylene in the presence of a catalyst wherein the catalyst is obtained by reacting (a) a palladium compound selected from the group consisting of salts of carboxylic acids and complexes of halides and triarylphosphines, (b) tin chloride, (c) a bidentate ligand of the general formula

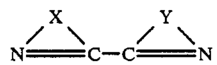

wherein X and Y represent similar bridging groups, each containing four atoms in the bridge at least two of which are carbon atoms and (d) an organic oxidant selected from the group consisting of 1,2-benzoquinones, 1,4-benzoquinones, aliphatic nitrites, aromatic nitro-compounds, and peroxides, and under conditions suitable to prepare a linear alternating polymer.

16. The process of claim 16 wherein the nitrogen bidentate ligand is selected from the group consisting of substituted and unsubstituted 2,2'-bypyridine and substituted and unsubstituted 1,10-phenanthroline.

* * * * *